United States Patent
Haase

(10) Patent No.: US 10,481,900 B2
(45) Date of Patent: Nov. 19, 2019

(54) METHOD FOR UPDATING A FIRMWARE COMPONENT AND DEVICE OF MEASUREMENT AND CONTROL TECHNOLOGY

(71) Applicant: Endress+Hauser Conducta GmbH+Co. KG, Gerlingen (DE)

(72) Inventor: Björn Haase, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 196 days.

(21) Appl. No.: 15/483,208

(22) Filed: Apr. 10, 2017

(65) Prior Publication Data
US 2017/0293484 A1 Oct. 12, 2017

(30) Foreign Application Priority Data

Apr. 11, 2016 (DE) .......................... 10 2016 106 625
Apr. 13, 2016 (DE) .......................... 10 2016 106 819

(51) Int. Cl.
| | |
|---|---|
| G06F 8/658 | (2018.01) |
| H04L 9/32 | (2006.01) |
| G06F 12/14 | (2006.01) |
| H04L 9/08 | (2006.01) |
| H04L 9/14 | (2006.01) |

(Continued)

(52) U.S. Cl.
CPC .............. *G06F 8/658* (2018.02); *G06F 8/654* (2018.02); *G06F 12/1408* (2013.01); *H04L 9/0869* (2013.01); *H04L 9/0891* (2013.01); *H04L 9/14* (2013.01); *H04L 9/3247* (2013.01); *H04L 63/0428* (2013.01); *H04L 63/123* (2013.01);

(Continued)

(58) Field of Classification Search
CPC ....... H04L 9/0869; H04L 9/0891; H04L 9/14; H04L 9/3247; H04L 9/3263; H04L 63/12; G06F 8/65; G06F 8/66; G06F 12/1408
See application file for complete search history.

(56) References Cited

U.S. PATENT DOCUMENTS

| 6,718,374 B1 | 4/2004 | Del Sordo et al. |
|---|---|---|
| 2004/0019796 A1 | 1/2004 | Wang |

(Continued)

FOREIGN PATENT DOCUMENTS

| EP | 1619824 B1 | 10/2013 |
|---|---|---|
| WO | 0161437 A2 | 8/2001 |

OTHER PUBLICATIONS

Search Report for German Patent Application No. 10 2016 106 819.5, German Patent Office, dated Jan. 17, 2017, 10 pp.

*Primary Examiner* — Paul E Callahan
(74) *Attorney, Agent, or Firm* — Mark A. Logan; PatServe

(57) ABSTRACT

The present disclosure relates to a method for updating a firmware component of a measurement and control technology device. The method includes: a segment-by-segment reception of a first firmware image; an authentication of the first firmware image based upon a first encryption method; a creation of a second authentication datum for the first firmware image via an algorithm that differs from the first encryption method; a re-transmission of the data used for updating the firmware component as a second firmware image; an authentication of the second-firmware image based upon the second authentication datum; and in the case of a successful authentication of the second firmware image, enabling and execution of the firmware program code.

15 Claims, 1 Drawing Sheet

(51) Int. Cl.
*H04L 29/06* (2006.01)
*G06F 8/654* (2018.01)
*G06F 8/61* (2018.01)

(52) U.S. Cl.
CPC ...... *G05B 2219/25112* (2013.01); *G06F 8/63* (2013.01); *G06F 2212/1052* (2013.01)

(56) References Cited

U.S. PATENT DOCUMENTS

| | | |
|---|---|---|
| 2011/0276958 A1 | 11/2011 | Nishikawa |
| 2012/0079287 A1* | 3/2012 | Leclercq .............. G06F 21/575 713/192 |
| 2017/0141920 A1* | 5/2017 | Herder, III ............. G06F 21/32 |

* cited by examiner

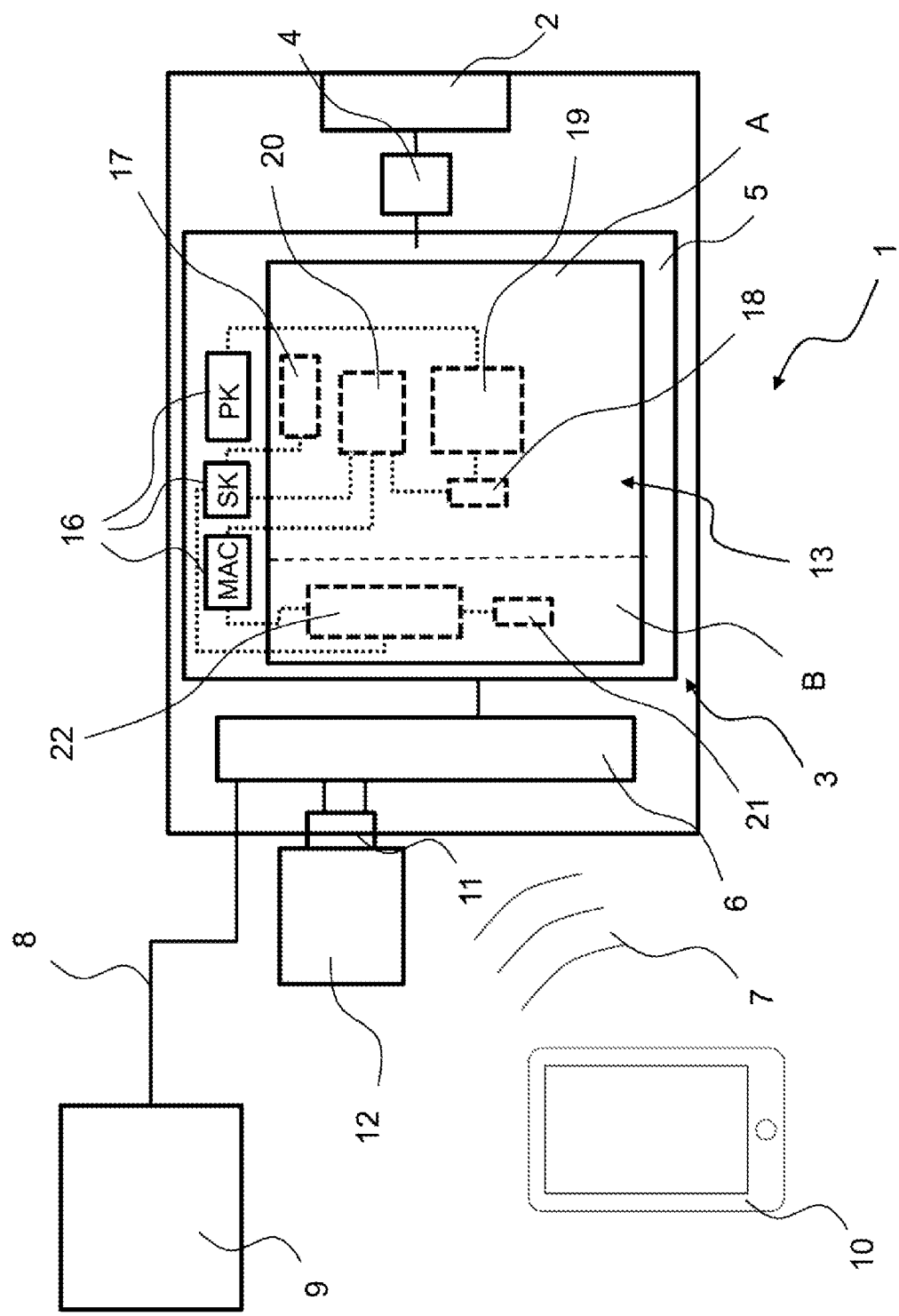

METHOD FOR UPDATING A FIRMWARE COMPONENT AND DEVICE OF MEASUREMENT AND CONTROL TECHNOLOGY

CROSS-REFERENCE TO RELATED APPLICATIONS

The present application is related to and claims the priority benefit of German Patent Application Nos. 10 2016 106 625.7, filed Apr. 11, 2016 and 10 2016 106 819.5, filed on Apr. 13, 2016, the entire contents of which are incorporated herein by reference.

TECHNICAL FIELD

The present disclosure relates to a method for updating a firmware component that provides the functionality of a device of measurement and control technology and relates further to a device of measurement and control technology.

BACKGROUND

Measurement and control tasks in the industrial sector are often crucial for safety. Customer applications require safeguarding the accuracy and the availability of measurement and control variables of the respective automation. Integrity and availability of data is, in most cases, more relevant than the likewise important confidentiality. The special safety relevance of devices of measurement and control technology, such as measuring devices, controllers, sensors, actuators, monitoring circuits, warning displays, fieldbus network technology, etc., increases because the consequences of malfunctions of or tampering with these devices may be potential hazards, such as explosions, discharge of hazardous materials/gases, etc.

Automation solutions consist of a plurality of independent subcomponents, such as controllers, sensors, network infrastructure components such as routers, etc. These subcomponents can each be designed separately as an individual device of measurement and control technology or also be at least partially integrated into a device. Today, each of these subcomponents typically contains its own software components so-called firmware. In addition, each individual device, such as a field device for pH measurement, can also be composed of several submodules that each contains its own firmware for example, a subsystem having a microcontroller for each fieldbus interface, a subsystem for measured value signal processing, as well as a subsystem for analog-digital conversion. The firmware is embedded in the microcontroller in each case. In addition to the integrity of the data transfer to the communication interfaces (fieldbus, Ethernet, wireless HART, etc.) of devices or subcomponents, the integrity of the measured value processing in the subcomponents (transmitter, sensor) is crucial for the accuracy of the measurement.

A possible attack scenario is that an attacker slips manipulated firmware components to the operator of an automation system. Thus for example, within a temperature sensor the temperature measured values measured by the sensor could be intentionally manipulated within the firmware so that the control system connected to the sensor reports a non-critical operating temperature, while, in reality, the monitored process has a greatly elevated temperature which could lead, for example, to the explosion of a tank.

For a successful attack, it is usually sufficient to manipulate the firmware of an arbitrary subcomponent within an attacked device or within an attacked system containing a plurality of devices.

A concrete example using a pH-measuring point: a pH-measuring point generally contains a pH and a temperature transducer, which are usually combined into a single device. The device further contains device electronics connected to the transducer. These can include, for example, one or more microcontrollers for analog-digital conversion of the output of the transducer, an additional microcontroller for processing measurement signals, a fieldbus interface for transmission of the measurement signals via a fieldbus, and a system that handles the operation of fieldbus interfaces. If an attacker would like to manipulate the transmitted temperature measured values of such a pH measurement point, for example, he can achieve this goal by selectively manipulating the firmware within the microcontroller for analog-digital conversion of the output signal of the temperature transducer or the firmware of one of the other subcomponents of the device.

The reliable repulsion of an attack launched using manipulated firmware components thus requires that the firmware of all involved subsystems and subcomponents be checked.

In the past, it was often customary that the integrity of firmware did not need to be considered for such security concerns, because programming of firmware took place using so-called metal masks during chip production or, in the case of so-called flash memory areas, reprogramming was, due to design constraints, only possible at the production facilities of the device manufacturer for a component. The current state of the art, however, is that it is possible to import new firmware into all subcomponents a so-called firmware update at any time during the runtime, even in the field.

Ensuring the integrity of all firmware components involved, without exception, is therefore crucial for ensuring the complete integrity of the system.

As a consequence, both the "large" systems having lots of memory and very computationally weak microcontroller systems must be secured. In the cryptographic context, the necessary so-called "authenticity" of firmware is spoken of here, in which the receiving system checks that the firmware component to be received in the course of the update is authentic meaning, for example, actually created by the device manufacturer, and not by a possible attacker.

Two large classes can be distinguished in regards to the cryptographic verification of authenticity:
  Symmetric check sum methods using authentication codes (so-called message authentication codes, abbreviation: MAC), such as AES-CBC, HMAC-MD5, HMAC-SHA256, Chaskey, Chaskey-LTS, Galois field-based MAC's such as the authentication components in AES-GCM, as well as primary number-based methods such as Poly1305, etc.
  Asymmetric signature methods such as RSA-based signatures, ECDH signatures on elliptical curves, EdDSA signatures, hash-based signature methods, DSA signatures, etc.

The two classes of methods can be used via cryptographic methods, hereinafter also described as encryption methods, to generate an authentication datum, e.g., a check sum or a digital signature, which can be delivered together with the firmware component that serves to update the firmware of a system. Using the authentication datum and key information, the receiving system can then verify whether the delivered firmware component is authentic or not.

The two aforementioned method classes are differentiated, on the one hand, in that, for symmetric methods, the exact same key is used both for generating the authentication datum as well as for verifying the authentication datum, whereas different keys are used in asymmetric methods. On the other hand, the two method classes differ in their complexity and with regard to their need for computing time and/or memory, and in the code size of the methods implemented in the software.

In symmetric methods, each entity that can conduct an authentication test can itself also generate a correct check sum as an authentication datum, since the key used must be "symmetrically" available to the two parties involved. In asymmetric methods, different keys are present on either side (generation and testing).

Symmetric check sum methods today are so stable and secure in the view of many cryptographers that mathematical attacks on the basic algorithms can practically be excluded, if key lengths of more than 80 bits are used. Today, symmetric keys of at least 128 or 256 bits long are often recommended.

However, there is a major problem with using symmetric methods in the context of systems having small microcontrollers. For verifying the authenticity of a newly offered firmware component, it is necessary for the symmetric key to be kept in the persistent memory of the system. In conventional microcontrollers, however, this memory cannot be effectively protected against unauthorized reading. It's true that there are electronic building blocks from the so-called smart card IC class, which, for example, protect the persistent memory of a controller against unauthorized access by means of special metal coverings of the memory area and sophisticated protection mechanisms. Such countermeasures are, however, not used in conventional microcontrollers.

It is thus possible for an attacker to improperly obtain the symmetric key information relatively easily for example, by opening the housing or bypassing the access restriction of an interface for debugging software (debugger interface). The attacker can then easily generate a correct check sum for his manipulated firmware components and plant them in a subsystem without causing an error.

The main advantage of the symmetric methods is that they can be efficiently implemented in systems having low processing power. In particular, this requires very little source code and CPU power. So, for example, a MAC algorithm such as Chaskey LTS can be implemented in an ARM Cortex M0 CPU having an approximate program length of just 512 bytes. In contrast to asymmetric signature methods, a so-called collision-resistant hash algorithm, for example, which typically requires larger constant tables and a relatively large amount of program code, is not mandatory as a subcomponent.

The main difference between symmetric and asymmetric methods is that, in asymmetric methods for generating a signature as an authentication datum, another key is used for the verification of the signature. In this case, the key for signature generation is referred to as a "private" key, and the key used for verifying the signature is referred to as a "public" key. The private key used for the signature of a firmware component can thus be kept exclusively in a secure environment for example, inside an access-controlled area within the development department at the device manufacturer. This private key can, therefore, be much more effectively protected against potential attackers than in an unprotected memory stored in a field device. When an asymmetric signature is used, only the non-critical public key, which an attacker cannot use on his own to sign a manipulated firmware, is inside the persistent memory of the systems of the device containing the microcontroller.

For asymmetric methods today, considering the possible attacks against the mathematical methods, key lengths of at least 2048 bits (in methods using DSA or RSA based upon methods based upon factorization of large numbers and groups of prime number fields), or >230 bits for methods based upon elliptical curves, are required. Alternative methods, e.g., the so-called Merkle signature based upon hash trees, code-based signatures (McEliece), or so-called lattice-based signature methods (for example, LWE, Learning with Errors) require far longer keys of 10 KB and more and are, therefore, not often used in practice. In the context of high-performance computing systems, such as web servers on the Internet, signatures based upon methods like RSA, DSA, or ECDSA are widely used, e.g., in so-called certificates, as they are used by keyed protocols such as HTTPs or TLS.

The challenge is that these methods require significantly more computing resources than symmetric methods because of the complex algorithms and large key lengths. Thus, even an optimized software implementation of asymmetric cryptography in small microcontrollers already needs about 10 KB of memory (Des. Codes Cryptogr. (2015) 77: 493-514). In comparison to symmetric methods, therefore, at least a 10- to 100-fold larger memory requirement for the associated program code is to be expected.

Inside an industrial control device, there are typically individual components that provide sufficient resources for the standard procedures. For example, within a pH sensor, a CPU responsible for the fieldbus communications could provide sufficient memory and processing power. As explained above, however, this is not sufficient for securing an individual subsystem. Instead, all firmware components involved must be protected, even in the smaller subsystems for example, for the analog-digital conversion near the physical transducer.

Outsourcing the signature verification to only the high-performance CPU's of a component entails the risk that errors in the protocols within one component can affect the other components. That is, the security of a firmware component (for example, for A/D conversion) is then a function of the correctness of another firmware component (for example, fieldbus CPU), which may in some cases be under the control of another organizational unit, or even an outside company, and cannot be verified. This increases the number of possible error sources in conception and implementation.

A feature of security is that systems of lower complexity are always desirable. In practice, this is frequently attained only if each CPU in a firmware update is, on its own, completely responsible for the firmware authentication, the verification thus occurring de-centrally. In practice, secure systems can often be designed only in this manner.

The following considerations are important for the firmware update process in an embedded system. The computing system typically is made up of a processing unit, as well as a RAM memory for dynamic data and a (flash) ROM memory for persistent data. The processing unit (CPU) obtains the machine instructions from the ROM memory, and persistent data, such as cryptographic keys, are also stored there.

The current state of the art is that microcontrollers are equipped with a built-in ROM memory called flash technology. Flash memory usually dominates the silicon surface of the microcontroller and is thus the critical cost component in the production of the microcontroller chips. For reasons of cost, therefore, building blocks tailored precisely to just the memory needed are typically used. A typical embedded system thus usually provides no more than just the RAM and flash ROM needed to be able to temporarily store the previous as well as the "new" firmware components during a firmware update.

For this reason, a distinction is usually made between two firmware components: a so-called bootloader component (hereinafter referred to as bootloader, for short) and an application component (hereinafter also referred to as application, for short). In a typical microcontroller having, for example, a total of 64 kB of flash memory, the total firmware consists of, for example, a bootloader having, for example, 4 kB of flash and an application having 59 kB of flash and 1 kB of data memory.

The task of the bootloader is, therefore, to enable an exchange of the application firmware. To this end, the application area of the flash is first erased by the bootloader. In many cases, the flash in microcontrollers is separated at this point by hardware into a so-called "bootloader" section and an "application" section, wherein the bootloader and application sections can be erased separately. In such systems, the maximum possible size of the bootloader is thus limited by the hardware to lengths of typically 4 or 8 kB. After the erasing process, the application is no longer available. Next, a new application firmware is sent to the bootloader via an external data interface and then re-installed in the flash memory.

It is important in the context of generation and/or verification of cryptographic authentication data that the complete firmware components transmitted in the update must be used for the generation and verification of an authentication datum. For obvious reasons, verification of the authentication datum from the bootloader part of the software is required in the type of firmware upload described above.

As one can easily see from the aforementioned typical example, it is, predictably, not possible to implement secure asymmetric cryptographic methods (typically, having at least 10 kB code length) under the constraints of the code size restriction of the bootloader. In the context of normal application (in the example, 59 kB of code), such methods are, however, very easy to implement.

BRIEF SUMMARY

In summary, the aim of the present disclosure, in the above context, is to enable a decentralized, secure, asymmetric signature verification, as well as in subcomponents having low computing power in particular, under the limitations of a bootloader firmware.

The method according to the present disclosure for updating a first firmware component that provides the functionality of a device of measurement and control technology and that is embedded in a microcontroller of the device includes: segment-by-segment reception of a first firmware image via a data interface of the microcontroller that is connected to an external device, wherein the first firmware image includes a data area and a signature field, and wherein the data area used for updating the first firmware component includes data including a firmware program code, and the signature field includes a first authentication datum produced according to a first encryption method; execution of an authentication of the first firmware image based upon the first authentication datum via an authentication algorithm according to the first encryption method that is contained within the first firmware component; creation of a second authentication datum for the data contained in the data area of the first firmware image via an algorithm, contained in the first firmware component, for the creation of the second authentication datum according to a second encryption method that differs from the first encryption method; following successful authentication of the first firmware image, storage of the second authentication datum in a persistent memory of the device; erasure of the first firmware component, wherein erasure is controlled by a second firmware component embedded in the microcontroller; re-transmission of the data used for updating the first firmware component as a component of a second firmware image, with participation of the second firmware component via the data interface to the microcontroller and storage of the data in the persistent memory of the microcontroller; execution of an authentication of the second-firmware image received during the re-transmission based upon the second authentication datum stored in the microcontroller via an authentication algorithm according to the second encryption method that is contained within the second firmware component; and in the case of a successful authentication of the second firmware image, enabling and execution of the firmware program code, transmitted with the second firmware image and stored in memory, as the new first firmware component.

The present disclosure is based upon the recognition that there are less elaborate encryption methods, such as symmetrical check sum methods for check sum validation, within easy reach for a resource-constrained firmware component, such as the initially described bootloader, in contrast to asymmetric encryption methods. This applies especially when using the so-called "lightweight" algorithms like Chaskey, Chaskey LTS, or so-called Cipher Block Chaining (CBC) authentication codes based upon lightweight block cipher algorithms such as "Simon" or "Speck" (see also National Institute of Standards and Technology NIST), or in the case that the corresponding microcontroller contains crypto-accelerator hardware for example, for AES.

Because the first firmware component performs an authentication of the first firmware image according to an authentication algorithm based upon a first encryption method, simultaneously generating an authentication datum according to a second encryption method different from the first encryption method while using the first firmware image, and the data obtained with the second firmware image during the updated transmission can be authenticated by the second firmware component using the authentication datum generated by the first firmware component, the option is provided of using a more complex, and thus more secure, encryption method than the first encryption method, and of using a simpler encryption method needing, therefore, fewer resources than the second encryption method. The authentication using the first firmware component can thus ensure, via an elaborate, e.g., asymmetric, encryption method, that manipulation by an attacker during the first transmission of data using the first firmware image is prevented. The authentication using the second firmware component ensures that the data received during the new transmission with the second firmware image are identical to the data of the first firmware image received during the first transmission. A less elaborate for example, symmetric encryption method is, therefore, sufficient for this purpose.

The method can therefore be advantageously used in a firmware update, as described initially. In this case, the first firmware component is the application, and the second firmware component is the bootloader. As mentioned before, the second firmware component, or the bootloader, respectively, can be a resource-constrained firmware component. For example, its maximum size can be 20 kByte or less, or even only 16 kByte, or it can be as small as 4 or 8 kBytes.

The term firmware image here describes a suitable combination of a data area, which can contain a firmware program code and constant data, and an optional signature field. The data contained in the data area are also referred to hereinafter as firmware data or firmware, for short. The first firmware image includes a signature field that contains the first authentication datum. The second firmware image can contain a signature field with an authentication datum in particular, the first authentication datum. In particular, it can completely coincide with the first firmware image, meaning that one and the same firmware image is transmitted twice during the method described above namely, the first time to the first firmware component for authentication according to the first encryption method and for generating the second authentication datum, and the second time to the second firmware component for the described authentication using the second authentication datum generated by the first firmware component. It is also possible, however, that the second firmware image contains only a data area having the firmware data.

The method can further include: in the case of an unsuccessful authentication of the second firmware image, erasure of the data transmitted and stored with the second firmware image in particular, of the saved firmware program code.

A successful authentication here means that the authentication algorithm leads to the result that the firmware image to be authenticated or the received data to be authenticated is/are authentic.

In an advantageous embodiment, the authentication algorithm contained in the first firmware component according to the first encryption method requires a memory capacity of more than 5 kB of ROM and 512 bytes of RAM.

In an additional advantageous embodiment, the algorithm contained in the first firmware component for generating the second authentication datum according to the second encryption method and the authentication algorithm contained in the second firmware component according to the second encryption method require a memory capacity of less than 512 bytes of RAM and 1 kB of ROM.

The first encryption method can, for example, be an asymmetric encryption method. Options are, for example, a method based upon elliptical curves in particular, based upon the EdDSA algorithm for the elliptical curve Curve25519 a method of the ECDSA standard family, or a method based upon prime number fields in particular, an RSA or DSA method.

The second encryption method can, for example, be a symmetric encryption method. For example, a MAC method based upon a block encryption algorithm in particular, based upon the Chaskey or AES128-CBC algorithm family is appropriate.

The first authentication datum can be a digital signature created via a private key using data contained in the data area in particular, the firmware program code wherein the performance of the authentication of the first firmware image includes a verification of the digital signature via a public key stored in a persistent memory of the microcontroller.

In one embodiment, the creation of the second authentication datum includes the creation of a check sum, serving as a second authentication datum, according to the second encryption method from a key generated from a key generator included in the first firmware component and the data included in the data area in particular, the program code included in the first firmware image.

The key generated via the key generator can be stored in a persistent memory of the microcontroller, wherein the performance of an authentication of the second firmware image using the second authentication datum includes the following steps: generation of a check sum according to the second encryption method from the key generated via the key generator and the data included in the second firmware image in particular, the firmware program code included in the second firmware image; and
comparison of the check sum with the second authentication datum, wherein the authentication is successful if the check sum corresponds to the second authentication datum.

In rare cases, it could be desirable to also define sections within the firmware image that, while they are to be transmitted, are not intended to be cryptographically protected, i.e., sections that are intentionally not used for the calculation of the authentication datum. That could include, for example, data areas in which explanatory instruction texts for the firmware are added after signature generation, such as a list of known error issues with descriptions and recommended measures added after delivery of the software. These data segments may in some cases be excluded from the signature verification according to the first encryption method, if needed, or from the check sum generation and authentication according to the second encryption method.

The key generator can, for example, include a random number generator, wherein the key is a random number sequence of preferably at least 80 bits.

The firmware program code of the first and of the second firmware images can, optionally, be encrypted. The method additionally includes in this case the decryption of the firmware program code via an additional decryption algorithm of the first and/or the second firmware component. A symmetric encryption method would advantageously be used for this, the key for which is stored in the persistent memory of the microcontroller.

The present disclosure also includes a device of measurement and control technology including device electronics having at least one microcontroller, wherein the at least one microcontroller includes an embedded firmware that has at least one first firmware component and a second firmware component, and wherein the first firmware component includes: one or more algorithms for the provision of functionalities of the device; an algorithm for the reception of a first firmware image, which includes a data area and a signature field, wherein the data area used for the updating of the first firmware component includes data containing a firmware program code, and wherein the signature field contains a first authentication datum produced according to a first encryption method; an authentication algorithm for the authentication of the first firmware image based upon the first authentication datum according to a first encryption method; an algorithm for the generation of a second authentication datum from the data included in the data area in particular, the firmware program code according to a second encryption method differing from the first encryption method; and an algorithm for the storage of the second authentication information in a persistent memory of the microcontroller, and wherein the second firmware component includes: an algorithm for the reception of a second firmware image that includes the data used for the updating of the first firmware component in particular, a firmware program code used for updating the first firmware component; an algorithm for the erasure of the first firmware component and for the storage of the firmware program code included in the second firmware image as a new first firmware component; an algorithm for reading the second authentication datum from the persistent memory; an authentication algorithm according to the second encryption method for the authentication of the second firmware image based upon the second authentication datum and the data included in the second firmware image in particular, the firmware program code; and an algorithm for enabling the new first firmware component.

The device can, therefore, be designed to carry out the previously described method. The second firmware component can be resource-constrained. For example, it can be a bootloader with a maximum size of less than 20 or 16 kBytes, such as 4 or 8 kBytes.

The first encryption method can be an asymmetric encryption method, and the second encryption method can be a symmetric encryption method. The first firmware component can further include a key generator, which includes a random number generator, and an algorithm for the storage of a key generated via the key generator for the second encryption method in a persistent memory of the microcontroller. The authentication algorithm according to the second encryption method can be designed to create a check sum from the saved key and the firmware program code, and to compare it to the second authentication datum.

The first and/or the second firmware component can additionally include a further algorithm for the decryption of a firmware image or the data that are contained within the data area included in the firmware image in particular, of a firmware program code included in the firmware image in particular, with a symmetric encryption method.

The transmission of the first and/or second firmware image to the device can also occur while an easily accessible data transmission channel is used in particular, when a remote maintenance or wireless interface is used or when a transportable data storage medium, such as a USB stick or an SD card, is used.

The device can, in particular, be a measurement device, which has a transducer that generates measurement signals in particular, digital signals as a function of a measured variable. In this embodiment, the device electronics can include measuring electronics, connected in particular, detachably or non-detachably to the measuring transformer for the reception of measurement signals, that are designed to process the measurement signals and to output the processed measurement signals to a higher-level unit.

BRIEF DESCRIPTION OF THE DRAWINGS

FIG. 1 shows a schematic drawing of a device of measurement and control technology.

DETAILED DESCRIPTION

The device 1 represented schematically in FIG. 1 is a measurement device having a transducer 2 and sensor electronics 3. Sensor electronics 3 include an A/D converter 4, which digitizes the analog signals generated by transducer 2, a microcontroller 5, which receives and further processes the digitized measurement signals, and a data interface 6, via which microcontroller 5 can output the processed measurement signals and/or other data wirelessly 7 or via a conductor loop 8 to a higher-level unit 9, 10. In this example, higher-level unit 10 is a portable computer such as a smart phone. Higher-level unit 9 can be a process control station for an industrial process. Device 1 also has an interface 11 for connecting to a memory device for example, an SD card 12. Device 1 can optionally connect to higher-level unit 9 and/or higher-level unit 10. To perform an update, a firmware image that contains the program code for the new firmware can be transmitted from unit 9 via conductor loop 8 or from unit 10 wirelessly 7, or from SD card 12 connected to device 1 via interface 11 to device 1 specifically, via data interface 6 to microcontroller 5.

Microcontroller 5 has a flash memory with a firmware 13, which contains at least two firmware components A, B. The first component is an application component, hereinafter abbreviated as application A. The second component is a bootloader component, hereinafter abbreviated as bootloader B. Application A provides basic functionalities of device 1. Bootloader B serves to update application A in the form of a firmware update according to the method described in the introduction. Device 1 additionally has a persistent memory 16, which is represented in the example as part of microcontroller 5. A public key PK of an asymmetric signature method is stored in persistent memory 16 of the device.

Firmware component A has the following components:
  an entropy source 17 for example, a random-number generator
  an algorithm 18 for receiving a new firmware image in particular, in segments
  an algorithm 19 for asymmetric signature verification
  an algorithm 20 for generating a MAC check sum that serves as an authentication datum according to a symmetric encryption method for example, a MAC algorithm
  a software component for storing a symmetric key SK and a generated check sum MAC in persistent memory 16

Firmware component B contains the following components:
  an algorithm 21 for receiving a new firmware image
  an algorithm 22 for reading symmetric keys SK and MAC from memory 16 and for calculating and verifying a symmetric check sum MAC of the new firmware transmitted as part of the new firmware image Optionally, components A and/or B also contain an additional algorithm for decrypting a firmware image or a firmware program code contained in the firmware image via a symmetric key (not shown in FIG. 1). This encryption component, however, serves only as know-how protection for the device manufacturer of the automation component and not primarily as protection for an installation operator against a data security attack. It is, therefore, optional.

The method for updating firmware 13 in particular, of application A is that the authentic device manufacturer chooses an asymmetrical signature algorithm and creates a public/private key pair. The manufacturer carefully ensures that only authorized persons who are responsible for the release of authentication software can obtain control over the private key. The corresponding public key PK is then made known and stored, including in memory 16 of delivered device 1, so that this public key PK is available there for the firmware-update process.

In firmware component A, the following method steps are then implemented for the firmware update:
1. An unpredictable random number sequence SK of preferably at least 80 bits is generated using random number generator 17 and is stored in the persistent memory. This random number sequence serves in a further method step as symmetric key SK for a symmetric MAC algorithm.
2. The new firmware is transmitted via external interface 6 as part of a firmware image from an external device for example, one of the higher-level units 9, 10, or from SC card 12. The received firmware data here are received in segments by algorithm 18 and forwarded only to two encryption algorithms described below, and then discarded and not further stored. Therefore, microcontroller 5 need not provide any significant memory space for the reception and authentication of the new firmware.

3. Parallel to the transmission, symmetric MAC check sum algorithm 20 is carried out using the received firmware data. In addition to the received firmware data to be verified, the symmetric MAC check sum algorithm also receives as input newly generated key SK from memory 16.

4. Simultaneously, asymmetric signature verification using algorithm 19 takes place using public key PK stored in memory 16.

5. After a complete transmission of the new firmware image, the result of the asymmetric signature verification is available. The simple-to-verify symmetric MAC check sum calculated on the basis of key SK it just generated itself is also available.

6. If the asymmetric signature verification was successful, the associated symmetric MAC check sum is stored in persistent memory 16. A newly generated symmetric key SK and the symmetric check sum MAC generated for this key in the context of the asymmetric method are thus located there as recognized, "authentic" firmware. Especially advantageous here is that the key SK used for the symmetric check sum calculation cannot be predicted by an attacker.

After the successfully executed steps above, control is given to bootloader B. Then, the following steps are performed:

1. The memory area, in which the new firmware is to be stored, is prepared (erased). This storage area was previously at least partially reserved by application A.

2. The new firmware is transmitted a second time as part of an additional firmware image from the external device via data interface 6 and is stored in the prepared memory area during the reception. In this step, the optional decryption of the firmware program code takes place (in order to keep the firmware code secret and to protect proprietary information for example, of the device manufacturer).

3. Parallel to this second transmission, the symmetric check sum is calculated on the basis of persistent key SK and symmetric MAC algorithm 22, which can be implemented using little memory.

4. After reception of the complete firmware image, it is next verified that the MAC check sum calculated by bootloader B matches the corresponding MAC check sum calculated by application A and stored in memory 16. Conformity of MAC check sums implies conformity of the firmware data received from bootloader B during the second transmission with the firmware data previously received by application A during the first transmission and authenticated via algorithm 19 for signature verification. If this conformity obtains, authenticity of the transmitted firmware images, or of the firmware data contained therein, transmitted to bootloader B during the second transfer is simultaneously ensured.

5. If the symmetric check sums from firmware components A and B are identical, the newly received and now also persistent in memory firmware is actively connected and executed. Otherwise, step 1 in this process is performed again, and the obviously non-authentic firmware is erased.

It is significant that, in the case of the combination of firmware signature (authenticity) and firmware encryption (confidentiality) described as an option, the order of signature computation and encryption is interchangeable, and the order is not relevant for the method described here. It is suggested that the firmware be preferably first encrypted, and the signature calculated via the encrypted firmware.

In the specific exemplary embodiment, the system contained in device 1, to which a new firmware is to be transferred, includes a microcontroller 5 with 64 kB of flash memory. This memory is divided into a 59 kB application program (component A), a 1 kB data section, e.g., for cryptographic keys and MAC codes (memory 16), and a 4 kB bootloader (component B). In many cases, the memory of the microcontroller is directly integrated; in some systems, the memory of the microcontroller is connected via an external memory chip outside the housing of the CPU.

Candidates for this microcontroller would, for example, be 8-bit AVR series CPU's from Atmel or ARM-based microcontrollers from Texas Instruments, NXP, or ST Microelectronics, with comparable memory configuration. These systems typically provide 8 to 16 kB of RAM memory.

Bootloader B here integrates routines for partially erasing the flash, in addition to routines for receiving firmware via a serial SPI or UART interface.

The data for the firmware update are transmitted via an appropriate interface into device 1 in such a manner that the data can be transmitted via the serial interface to the subsystem that is to receive a firmware update. This transfer can, for example, occur wirelessly using Bluetooth or WLAN over the Internet via a remote access or via a fieldbus interface. In this case, an attacker who gains at least partial control over the data channel can transmit a non-authentic firmware image to the field device.

It is significant that particularly in the case of radio or Internet connections the transmission of firmware data can be manipulated completely unobserved, and, in this case, the authentication verification of the firmware via an asymmetric firmware signature is in some cases of particular importance.

Alternatively, it is possible to transmit the data via portable storage media, such as SD cards or USB sticks. Even here, an attacker having at least temporary access to the measuring device has the opportunity to attempt to transmit an inauthentic firmware image.

It is in some cases beneficial to temporarily store (cache) the data of the new firmware in a possibly available "larger" microprocessor system of the same measurement device before they are sent to the small microcontroller via the serial interface. In this case, a serial data connection is made from the microcontroller to the "larger" partner controller, which forwards the firmware image that may be cached.

Bootloader B implements a symmetric MAC algorithm (algorithm 22) for check sum calculation. The implementation of the Chaskey LTS algorithm is proposed as a specific exemplary embodiment; an alternative is the use of a MAC method based upon the algorithm AES128-CBC, for the case where, for example, a hardware accelerator unit for AES128 is available in the microcontroller, or another check sum method, such as from the Siphash family. These algorithms can be implemented under RAM requirements on the order of 64 bytes and flash requirements on the order of 512 bytes, and are thus compatible with the total memory budget of bootloader B of 4 kB.

Application A implements the same symmetric MAC algorithm (algorithm 20), as well as an asymmetric method for signature verification (algorithm 19). For the additional asymmetric signature verification used there during the firmware update, a method based upon, for example, elliptical curves is employed. For example, the EdDSA algorithm on the elliptical curve Curve25519. The use of curve Curve25519 and EdDSA here allows for a particularly code and resource-efficient implementation of the signature verification.

As an alternative to EdDSA on Edwards curves, so-called Koblitz curves in Galois fields or so-called "Short Weierstrass" curves from the standards of the NIST, of the SECP group, or of the so-called Brainpool Workgroup can be used for the asymmetric signature methods standardized under the name ECDSA (see, for example, Standard ANS X9.62, nvlpubs.nist.gov/nistpubs/FIPS/NIST.FIPS.186-4.pdf). The EdDSA algorithm uses, in addition to a so-called scalar multiplication on the elliptical curve, a cryptographically secure, collision-resistant HASH algorithm such as SHA512 or SHA-3. The signature verification algorithm EdDSA on Curve25519 (including SHA512) requires a memory capacity of about 15 kB of ROM and about 512 bytes of RAM, and can therefore be implemented within the memory budget of application firmware A.

Alternatively, implementations of asymmetric signatures based upon prime number fields, such as RSA- or DSA-based signatures, are also available for application A. In contrast to signature algorithms based upon elliptical curves (ECDSA, EdDSA), the advantage of the latter is that the signature fields are substantially shorter than when using RSA or DSA algorithms and, in contrast to RSA-based signatures, can be only marginally slower and have lower RAM memory requirements.

Public key PK required for signature verification is preferably compiled in each firmware image delivered. It can, however, also be stored independently from the firmware image in a defined memory area of the microcontroller for example, on the mentioned 1 kB area (memory 16) which is reserved for data.

The random number generation, for creation of a device-specific key SK freshly generated for each firmware update, occurs based upon the known method for cryptographically secure random number generation. In particular, the random number generator in the exemplary embodiment is parameterized via, inter alia, a so-called seed value transmitted one time during the device production, as well as additionally via entropy sources available in the device, such as noisy measured values, unpredictable time stamps, and, in some cases, hardware random number generators.

It is proposed, for example, that the random numbers be generated by first mixing together the different entropy sources, such as initial, device-specific, Factory Random-Seed FRS (calculated initially at the manufacturer's inspection station in the device production and stored in the flash memory), boot counter BC, noisy ADC values ADCNOISE, etc., using a so-called cryptographic hash algorithm such as SHA512 to a number RS=SHA512(FRS||BC||ADCNOISE). The result RS can then itself be used as a random number or as a key for a so-called stream cipher algorithm such as AES128-CTR, Salsa20, or Chacha20, which is then used to generate the random number. This approach ensures that a potential attacker cannot predict the exact value of key SK used during the firmware update and thus has no way to generate a firmware image with manipulated data that is recognized incorrectly as authentic in the above-described second transmission via the external data interface to boot loader B.

For new firmware to be transmitted for updating the system firmware in device 1, a signature field is generated with the help of a private key. This key is available only to a circle of people selected by the device manufacturer. Next, to the program code and any associated constant data areas of the firmware, the EdDSA signature AS calculated from it is appended. The term firmware image here designates a suitable combination of a data area (firmware program code+constant data) and an optional signature field. The data contained in the data area are also referred to as firmware data in the prior art, different so-called container formats are known for appending a signature field to a data block for example, under the ITU-T standard X.509, as it is used for Internet certificates. There are, for example, ready-made standard programs for verification of signature fields. In the case described here, for example, it is also totally sufficient to generate the firmware image by prepending a length specification to the data area and appending the signature field to the data area.

For the firmware update, a fresh key SK is determined by application A in microcontroller 5. The firmware image is then delivered to asymmetric signature verification algorithm 19 and, in parallel, also to symmetric MAC algorithm 20 (Chaskey LTS, for example). The latter uses symmetric key SK for the check sum calculation, which is freshly generated using the random number generator and is persistent in memory 16. Here, an important issue is that neither the signature verification nor the symmetric check sum method requires the firmware image to be available as a whole at a given point in time in the RAM memory of the microcontroller. Rather, it is sufficient to process the data of the firmware image little by little for example, in blocks of 16 or 128 bytes. In doing this, such a subsegment is used for the check sum method and then overwritten in memory, where applicable, by the next data segment. In technical terms, one often says that the two encryption methods can be implemented via a memory-saving "streaming" application, in which the data are transmitted in the form of a sequential "stream" of smaller subsegments.

In the process of transmitting the complete firmware image, application A also receives generated signature field AS, appended to the firmware image, via the serial interface. This externally received value AS is verified for authenticity via EdDSA algorithm 19 using the public key available from the device manufacturer.

If the signature verification runs successfully, symmetric check sum value MAC for the data of the just-received firmware image calculated using symmetric key SK is stored in flash memory 16, and control of the CPU is given over to bootloader firmware B.

This next erases the flash memory area previously occupied by application A. It finds key SK to be used for symmetric algorithm 22 (e.g., Chaskey) in memory 16 and the correct result of check sum MAC that firmware component A has just calculated. This check sum MAC cannot be predicted by anyone, not even by the device manufacturer, since unpredictable key SK is included in this value.

Next, bootloader B again requests the transfer of the complete firmware data, receives a subsequently transmitted second firmware image containing the firmware data, conducts the symmetric check sum calculation using the received firmware data, and verifies the correctness of the newly transmitted firmware image using the required correspondence to the appropriate results of old application A (which is now no longer available in flash). During this second transmission, the symmetric check sum calculation and the storage of the data in the prepared, erased flash area thus take place.

After a completely updated transfer of the new firmware image, verification of the symmetric check sum takes place. If the result corresponds to the check sum calculated with old application A, authenticity is recognized, and the new firmware is considered valid and actively connected. It therefore replaces previously erased, old application A. Next, the bootloader surrenders control to the new application and erases the data storage area of memory 16, in which the key SK and the symmetric check sums were stored during the last update.

The advantage of this method is that a reliable and robust asymmetric signature verification can be successfully implemented, even in the context of the limited memory budget of a bootloader.

In addition to the variations without encryption of the firmware described above, a person skilled in the art will also consider variations in which not only firmware authentication takes place, but also the firmware itself is encrypted. For this purpose, in addition to the device manufacturer's public key for the signature algorithm, a symmetric key for the firmware decryption (to be kept secret) is stored. The signature verification preferably takes place for the encrypted firmware, but can also be performed in a different order for the decrypted firmware.

It is significant that, after execution of method step 1 in bootloader component B, a firmware update is only possible using exactly the same firmware that was previously verified as correct in the application. Advantageously, a firmware ID will therefore be placed in flash memory together with key SK, and the symmetric MAC check sum calculated by the application that unambiguously identifies the firmware data to be transmitted for example, a firmware version number. Using this firmware version number, the bootloader software, for example, of the transmitting partner can thus communicate via data interface 6 exactly which firmware version is now expected. This can be relevant, for example, if a firmware update is interrupted (for example, because of a power failure) and should be resumed at a later instant.

In summary, the present disclosure offers the possibility of conducting secure asymmetric signatures for securing firmware updates even in the smallest microcontroller systems having limited memory budgets.

This advantage is essentially only bought with the disadvantage that the firmware must be transmitted not only once, but twice, and that signature verification takes place in the first step and the storage of the image and overwriting of the previous memory takes place only in the following step.

What is claimed is:

1. A method for updating a first firmware component that provides the functionality of a device of measurement and control technology and that is embedded in a microcontroller of the device, comprising the steps in the following order:
   receiving segment-by-segment a first firmware image via a data interface of the microcontroller that is connected to an external device, wherein the first firmware image includes a data area and a signature field, the data area includes a firmware program code for updating the first firmware component and the signature field includes a first authentication datum produced according to a first encryption method;
   authenticating the first firmware image based upon the first authentication datum via an authentication algorithm according to the first encryption method that is contained within the first firmware component;
   creating a second authentication datum for the data contained in the data area of the first firmware image via an algorithm contained in the first firmware component for the creation of the second authentication datum according to a second encryption method that differs from the first encryption method;
   storing the second authentication datum in a persistent memory of the microcontroller;
   erasing the first firmware component, wherein the erasure is controlled by a second firmware component embedded in the microcontroller;
   receiving a second firmware image via the data interface of the microcontroller that is connected to the external device, with participation of the second firmware component;
   storing the second firmware image in the persistent memory of the microcontroller, wherein the second firmware image includes the firmware program code for updating the first firmware component;
   authenticating the second firmware image using the second authentication datum stored in the persistent memory and using an authentication algorithm according to the second encryption method that is contained within the second firmware component; and
   enabling and executing the firmware program code, transmitted with the second firmware image and stored in memory, as a new first firmware component.

2. The method according to claim 1, further comprising:
   upon unsuccessful authentication of the second firmware image, erasing the second firmware image.

3. The method according to claim 1, wherein the first encryption method is an asymmetric encryption method.

4. The method according to claim 3, wherein the second encryption method is a symmetric encryption method.

5. The method according to claim 4, wherein the symmetric encryption method does not include any collision-resistant hash algorithm as a partial component.

6. The method according to claim 3, wherein the first authentication datum is a digital signature created with a private key using the firmware program code, and
   wherein the authentication of the first firmware image includes a check of the digital signature via a public key stored in the persistent memory of the microcontroller.

7. The method according to claim 4, wherein the creation of the second authentication datum includes creating a check sum serving as a second authentication datum according to the second encryption method from a key generated via a key generator included in the first firmware component and the firmware program code included in the first firmware image.

8. The method according to claim 7, wherein the key generated via the key generator is stored in the persistent memory of the microcontroller, and
   wherein the authentication of the second firmware image includes generating a check sum according to the second encryption method from the key generated via the key generator and the firmware program code included in the second firmware image and comparing the check sum with the second authentication datum, wherein the authentication is successful if the check sum corresponds to the second authentication datum.

9. The method according to claim 7, wherein the key generator includes a random number generator and the key is a random number sequence of at least 80 bits.

10. The method according to claim 1, wherein the firmware program code of the first and second firmware images is encrypted and wherein the method further comprises:
decrypting the firmware program code via an additional decryption algorithm of the first and/or the second firmware component.

11. The method according to claim 1, wherein the reception of the first and/or second firmware image occurs via a remote maintenance communication interface, a wireless communication interface, a USB interface, or an SD card interface.

12. A device of measurement and control technology comprising:
a device electronics having at least one microcontroller, the microcontroller including an embedded firmware having a first firmware component and a second firmware component, the first firmware component including
one or more algorithms for the provision of functionalities of the device,
an algorithm for the reception of a first firmware image, which includes a data area and a signature field, wherein the data area used for the updating of the first firmware component includes data containing a firmware program code, and wherein the signature field contains a first authentication datum produced according to a first encryption method,
an authentication algorithm for the authentication of the first firmware image based upon the first authentication datum according to the first encryption method,
an algorithm for the generation of a second authentication datum from the firmware program code according to a second encryption method differing from the first encryption method, and
an algorithm for the storage of the second authentication datum in a persistent memory of the microcontroller,
the second firmware component including
an algorithm for the reception of a second firmware image that includes the firmware program code used for updating the first firmware component,
an algorithm for the erasure of the first firmware component and for the storage of the firmware program code included in the second firmware image as a new first firmware component,
an algorithm for reading the second authentication datum from the persistent memory,
an authentication algorithm according to the second encryption method for the authentication of the second firmware image based upon the second authentication datum and the firmware program code included in the second firmware image, and
an algorithm for enabling the new first firmware component,
wherein the first encryption method is an asymmetric encryption method and the second encryption method is a symmetric encryption method,
wherein the first firmware component further includes a key generator, the key generator including a random number generator and an algorithm for the storage of a key generated via the key generator for the second encryption method in a persistent memory of the microcontroller, and
wherein the authentication algorithm according to the second encryption method is embodied to create a check sum from the generated key and the firmware program code included in the second firmware image and to compare the check sum to the second authentication datum.

13. The device according to claim 12, wherein the first and/or the second firmware component further includes an algorithm for the decryption of a firmware image or of data contained within a data area in the firmware image with a symmetric encryption method.

14. The device according to claim 12 further comprising at least one of the following: a remote maintenance communication interface, a wireless communication interface, a USB interface, and an SD card interface.

15. The device according to claim 12 further comprising a measuring transducer embodied to generate measurement signals as a function of a measured variable, and
the device electronics further including measuring electronics connected to the measuring transducer and embodied to receive and to process the measurement signals and to output the processed measurement signals to a higher-level unit.

* * * * *